Patented Sept. 16, 1930

1,776,072

UNITED STATES PATENT OFFICE

ROBERT E. JORDAN, OF BALTIMORE, MARYLAND, ASSIGNOR TO THE ALLBRIGHT-NELL COMPANY, OF CHICAGO, ILLINOIS, A CORPORATION OF ILLINOIS

MEAT CURING AND SMOKING APPARATUS

Application filed May 13, 1927. Serial No. 191,105.

The present invention relates to smoking, curing, and drying processes and apparatus and more particularly relates to improved processes and apparatus for efficiently drying, smoking and curing products such as Frankforts, sausage, minced ham, bacon, ham and the like.

In my copending application Serial No. 191,104 filed on even date herewith I have disclosed processes and apparatus for efficiently and rapidly handling large quantities of meats. The apparatus therein disclosed is primarily adapted for installation in permanent locations where a substantial amount of space is available. In many cases, owing to the lack of space or to smaller quantities of products to be handled, or because of lack of permanency of the equipment desired, it is desirable to supply smaller, less expensive, and portable smoking and curing apparatus. Accordingly, a primary object of my invention is to provide a small, preferably portable, and highly efficient apparatus in which a high grade uniformly cured product is secured and to provide improved processes adapted to the use of smaller and more compact apparatus than is disclosed in my above mentioned copending application.

My improved portable apparatus preferably comprises a smokehouse in which the articles to be cured are continuously circulated about a substantially vertical axis in a curing chamber through which properly heated and controlled drying and curing gases are passed. Various types of smokehouses have been proposed in which the articles to be cured have been continuously rotated about a vertical axis during the curing process. However, while this type of apparatus has been proposed for many years, so far as I am aware no commercially successful apparatus of this type has been produced. I have discovered that the failure of the prior rotary smokehouses of this type is due largely to the improper control and distribution of the heated gases in the curing chamber.

In the most successful forms of rotary smoking apparatus heretofore proposed, a single gas outlet or vent in the top of the curing chamber is provided as shown in U. S. Patent Numbered 629,351 issued July 25, 1889, and 1,524,533 issued January 27, 1925. Because of the arrangement of the gas outlet hot gases of combustion tend to pass in a strong hot current through a restricted area of the chamber while in the remaining sections of the curing chamber relatively cold gas pockets form so that wide variations in conditions occur throughout the curing chamber. Because of the poor distribution of the gases, in order to effect a cure in a reasonable time it is necessary to generate gases at excessive temperatures and to restrict the gas outlet so that the velocity of the current of gases through the curing chamber is relatively low. As the articles pass through the excessively heated current of gases passing towards the vent, the albumens on the surface of the articles tend to coagulate and the pores tend to contract so that the removal of moisture from the pores and penetration of the curing gases is restricted. Under the best conditions in such arrangements the products must be spaced substantially apart, making the capacity of the apparatus low, and even with wide spacing, the time of treatment required is long and the articles are poorly cured.

I have discovered that by proper control of the distribution temperatures, the velocity of the gases, and by maintaining a continuous movement of the articles to be cured, it is possible to crowd the meat together, the time of treatment may be considerably reduced, and uniformly cured high grade articles of improved quality are produced. By practicing my invention, the time of treatment of Frankforts and like small objects is reduced to from one-half to three hours, while the time of treatment of bacons, minced hams, and the like, is reduced to approximately six to eight hours, according to the weight thereof. In this way a substantial increase in capacity in apparatus of this type is attained, and at the same time uniformly cured and colored products of substantially higher quality are secured. I accomplish my improved results by providing a curing chamber with substantially no dead or unused space and by providing spaced gas outlets in the ceiling of the curing chamber so that the gases are compelled to rise in substantially uniform manner throughout the paths of movement of the articles under treatment. The velocities and temperatures of the gases are preferably controlled so that the coagulation of the albumens and rapid formation around the articles of a crust relatively impervious to moisture and gases is avoided. The continuous movement of the articles agitates the atmosphere and aids in maintaining substantially uniform temperature conditions in the paths of movement of the products through the curing chamber and a substantial increase in the velocity of contact with large warm volumes of relatively moderately heated gases with the products over that heretofore utilized may be secured, removing moisture to the desired degree from the pores of the product without causing contraction of the pores, in this manner conditioning the product for rapid penetration of the curing gases. In this way the relative volume of moderately heated gases with which the products are contacted in a given period of time is substantially increased over the volume of higher temperature gases with which the articles have been heretofore contacted in vertical smokehouses of prior art, and the articles are subjected to more uniform and more moderate temperature conditions than has heretofore been the practice.

In the handling of relatively heavy articles requiring a long time of cure and relatively deep penetration of the curing gases, I prefer to subject the product to an initial drying stage without the generation of the smoking or curing gases during which the products are contacted with air heated to a temperature of from 130 to 160 degrees Fahrenheit at which temperatures I have discovered that the moisture is removed rapidly from the pores to a sufficient degree to permit the rapid penetration of the smoking and curing gases into the product without causing substantial contraction or sealing of the outer pores. In the treatment of minced hams, bacon, and the like, this initial period of drying is maintained preferably from two to two and one-half hours. Smoke is then generated and contacted with such products for a period of approximately four to six hours, while the temperature of the gas is gradually reduced from 130 to 160 degrees Fahrenheit to 100 to 110 degrees Fahrenheit.

In the treatment of smaller articles such as Frankforts, sausage, and the like, in accordance with my improved processes, while an initial drying stage may be applied if desired, the time required for this drying is so short that the saving effected is in this manner generally not sufficient to warrant the division of the treatment into two stages. The character of these products also differs from the character of meat products such as minced hams, hams, bacon, and the like, and a satisfactory product may be secured by subjecting them to temperatures ranging from 130 to 160 degrees Fahrenheit throughout the entire operation while smoke may be generated from the beginning. Sausage treated in accordance with my improved process has imparted thereto a desirable bright color and improved flavor.

Accordingly, an object of the present invention is to provide improved processes for curing articles such as sausage, bacon, hams, and the like, in which proper conditions for rapidly and efficiently drying and imparting a uniform cure and suitable color thereto.

Another object of the invention is to provide novel processes and apparatus for the smoking and curing of meats utilizing vertical conveyors in which the meat products may be crowded so that the products substantially touch each other, while at the same time the velocity, temperatures, and distribution of the gases is such that substantial reductions in the time of treatment to effect the uniform cure are attained, and at the same time considerably improved products are secured.

Other objects of the invention will appear in the following detailed description of the preferred embodiments thereof and are such as may be attained by a utilization of the various principles, combinations, and subcombinations hereinafter more fully set forth and as defined by the terms of the appended claims.

Figure 1:
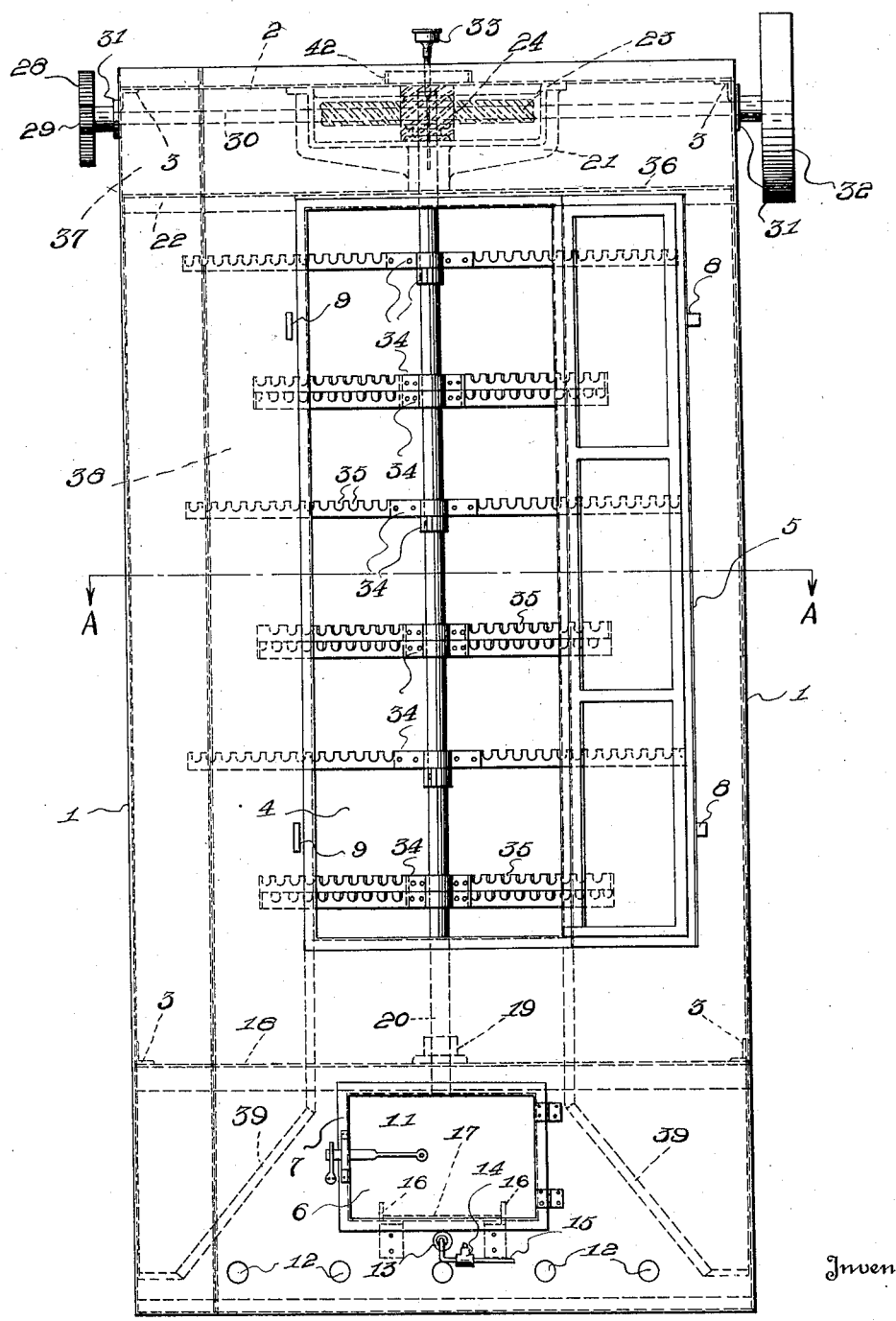
Figure 1 is a front elevation of a preferred arrangement of apparatus for carrying out my improved processes.
Figure 2:
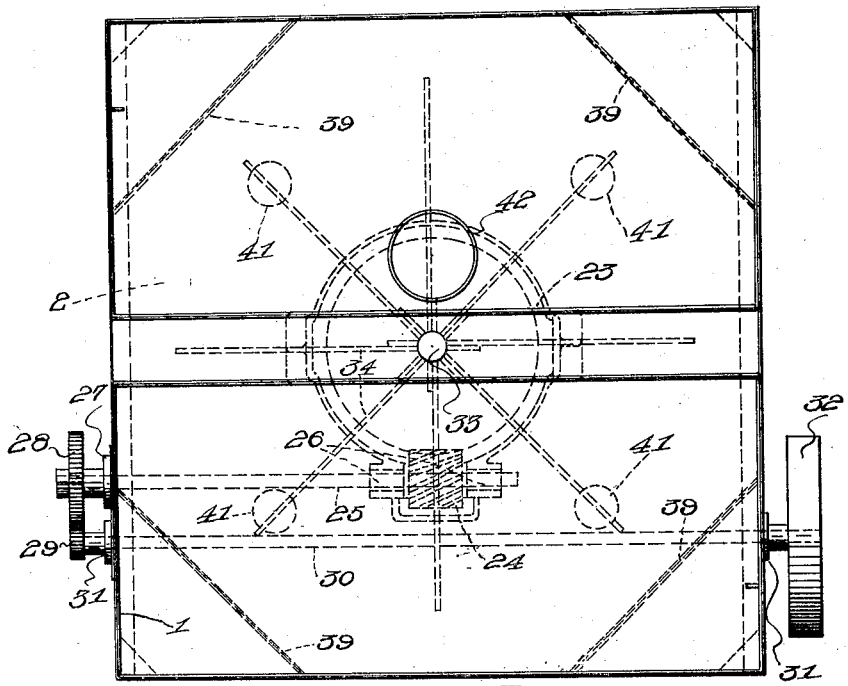
Figure 2 is a plan view of the invention shown in Figure 1.
Figure 3:
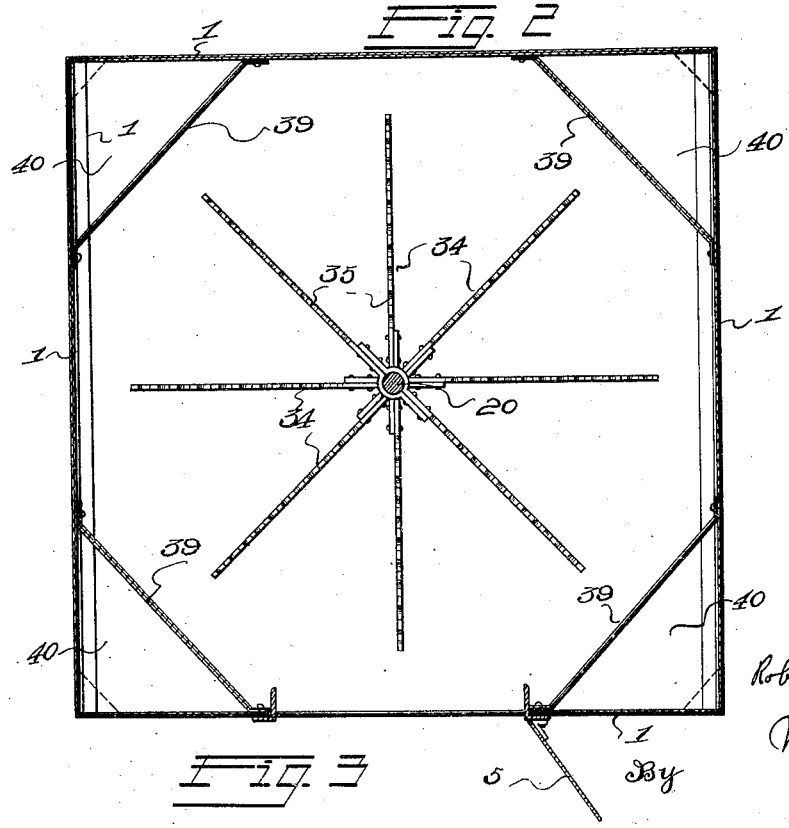
Figure 3 is a sectional view taken along the line A—A of Figure 1.

The preferred form of apparatus comprises the metallic side plates 1 and the top plate 2, secured together by the angles 3 into a rectangular house or compartment. Formed in the front plate 1 is a loading opening 4 provided with a hinged door 5 and a fire opening 6 provided with a hinged door 7. Door 5 is provided with suitable latch bars 8 adapted to engage the latch members 9 to lock the door in closed position, and fire door 7 is provided with a suitable latching mechanism 11. A plurality of air inlet openings 12 are provided adjacent the bottoms of the front and back plates 1, and beneath door 7 a burner 13 of any suitable type extends into the compartment. Burner 13 is connected through the valve 14 and piping 15 to a suitable supply of fuel such as gas or oil. Extending across the lower part of the compartment and secured to the front and back plates 1 are the angle iron supporting member 16 upon which a suitable plate or grate member 17 is mounted upon which sawdust or smoke producing materials utilized to produce the smoke for curing purposes are supported. Supported above the grate 17 on the cross member 17 is a bearing member 19 for the lower end of a vertical shaft 20. The upper end of shaft 20 is journaled in a casting 21 which is secured between and supported by the cross members 22 and the top of a compartment. Secured to and driving the upper end of the shaft 20 is a worm wheel or spiral gear 23 which meshes with and is driven by a suitable worm gear or spiral pinion 24. Pinion 24 is secured to and supported by a shaft 25 (Figure 2) which is journaled in the bearing extension 26 of casting 21 and in an outer bearing 27 supported on a side plate 1 of the compartment. Secured to the outer end of and driving shaft 25 is a spur gear 28 which meshes with and is driven by a pinion 29. Pinion 29 is secured to the end of a drive shaft 30 which is journaled in the bearing members 31, supported from side plates 1. Secured to the opposite end of and driving the shaft 30 is a suitable drive pulley 32 which may be driven by a belt from any prime mover. It will be noted that by the arrangement shown, pulley 32 and shaft 30 may be driven at a relatively high speed while shaft 20 will be rotated at a relatively low speed so that the products will not be thrown from arms 34 by centrifugal force. To provide for lubrication of the upper bearing for the shaft 20, a grease cup 33 may be utilized.

Secured to and spaced equally around shaft 20 are the laterally extending arms 34 provided with the notches 35 from which the articles to be cured may be supported in well known manner. Supported on the cross members 22 is a plate 36 which divides the compartment into an upper smoke chamber 37 and a curing chamber 38. Vertical plates 39 are secured in the corners of the curing chamber 38 and substantially reduce the size of the curing chamber and cut off a substantial amount of the dead area forming pockets 40 of the curing chamber from heat loss.

Formed in the ceiling 36 of the curing chamber 38 are the spaced openings 41 through which the heated gases from the curing chamber pass upward to the smoke chamber 37, and from the smoke chamber 37 of the stack connection 42 formed in the roof 2 of the compartment or house. It is to be noted that the openings 41 are disposed in such manner that the smoke and heated gases are compelled to rise upward in the chamber 38 adjacent the outer parts of sections of the chamber, and the space directly beneath the stack outlet 42 in ceiling 36 is closed. With this arrangement of smoke compartment between the ceiling of the curing chamber and the top of the smokehouse, a heat insulating compartment is provided which prevents loss by radiation, cooling of the curing chamber, and condensation of moisture on the lower surface of ceiling plate 36, and at the same time produces an economical distribution of the heated gases in the curing chamber.

In operation of this form of apparatus, in accordance with my improved process for the treatment of small products, such as sausage, Frankforts, and the like, arms 34 are loaded with the sausage to be smoked and the door 5 is then closed. Burner 13 is ignited, inducing rising currents of heated air due to the natural draft, and the temperature of the curing chamber is brought to approximately 130 to 160 degrees Fahrenheit. This temperature may be maintained without smoke being admitted into the curing chamber for a period of approximately from twenty to thirty minutes or smoke may be generated immediately, and the shaft 120 is driven to rotate the product through the curing chamber continuously and at a relatively low speed. During approximately the first half hour moisture is rapidly removed from the product without causing closing or contraction of the outer pores of the product and the formation of a cooked outer layer of the product such as is formed when higher temperatures are utilized due to coagulation of the albumens and if smoke is generated from the beginning, small articles such as Frankforts, may be cured and colored to the desired degree. At the end of approximately one-half hour, if no smoke has been generated in this period, sawdust or smoke producing material is introduced through the door 7, is ignited, and smoke is generated while the temperatures are maintained at 130 to 160 degrees Fahrenheit. The articles are circulated continuously for a further period of from one-half to three hours in contact with the smoke and curing gases, depending upon the product, until the desired degree of cure has been obtained. At the completion of treatment in this manner, the sausage is thoroughly cured and has a bright and highly desirable color imparted thereto, not secured by the usual and less efficient methods of smoking sausage heretofore in use.

In the case of minced hams, hams, bacon, and the like the arms 135 are loaded with meat products and the temperature in the curing chamber is raised approximately to 130 to 160 degrees Fahrenheit, and maintained for a period of from two to two and one-half hours while shaft 20 is driven to continuously circulate the products through chamber 38. This drys the products leaving the pores open and conditioned for rapid penetration of smoke and to receive the desirable color. At the end of the drying stage, sawdust or other smoke producing materials is ignited and the articles are smoked and kept under continuous circulation through the smoking chamber for a period of approximately five or six hours, depending upon the product, while the temperature in the curing chamber in this case is gradually reduced from 130 to 160 degrees to approximately from 100 to 110 degrees Fahrenheit. At the end of from six to eight and one-half hours total time of treatment depending upon the weight of the articles treated, the smoking and curing is completed and the products are of improved color and quality.

While a portable apparatus of relatively low cost has been disclosed as the preferred embodiment of carrying out my processes, it will be understood that the improved processes may be carried out in various types of apparatus.

Accordingly, having described preferred embodiments of the invention, what is desired to be secured by Letters Patent, and claimed as new is:

1. In meat smoking and curing apparatus comprising a curing chamber, means disposed below said curing chamber for generating heated curing gases, which pass upward by natural draft through said curing chambers, a false roof, and a roof proper spaced therefrom, said false roof having a plurality of openings through which said gases may pass on their way to exit through the roof proper, a vertical shaft disposed in said curing chamber, a plurality of laterally projecting meat supporting members secured to said vertical shaft in relatively close spaced relation, and means for continuously rotating said vertical shaft to move meat products supported on said lateral members repeatedly over predetermined substantially horizontal paths in contact with the heated gases rising through said curing chamber.

2. A smoke-house comprising heat producing and smoke generating means disposed adjacent the bottom thereof, a substantially vertical shaft supported above said heat and smoke producing means provided with a plurality of laterally extending meat supporting members; a smoke chamber formed at the top of said smoke house provided with a plurality of spaced openings communicating with said curing chamber or space; and means for rotating said vertical shaft supported adjacent the top of said smokehouse between the horizontal planes which bound said smoke chamber.

3. The combination as set forth in claim 2 in which said smokehouse is substantially rectangular in shape, together with vertical sheets disposed at the corners of the curing space, forming heat insulating spaces at the corners of the house, and substantially reducing the dead area of the curing chamber or space.

4. A portable smoking and curing apparatus comprising a rectangular house formed from metallic side walls and roof; metallic plates vertically disposed within the house across the corner thereof to impart rigidity to the house and to form, together with portions of the walls thereof, a curing chamber; said plates also serving to provide heat insulating dead air spaces; heat and smoke generating apparatus carried in the bottom of the house; a vertical shaft mounted between the roof and bottom of the house centrally of the curing chamber; a plurality of closely spaced and substantially horizontal supporting members carried by said shaft; and means for rotating said vertical shaft.

5. In the portable apparatus set forth in claim 4, said roof comprising a pair of perforated plates spaced to form a smoke chamber, the number of openings in the lower plate exceeding that in the upper plate; and said rotating means comprising a shaft disposed within said smoke chamber in driving engagement with said vertical shaft and projecting outwardly from the house to be connected to a source of power.

In testimony whereof I affix my signature.

ROBERT E. JORDAN.